United States Patent
Storm, Jr.

(10) Patent No.: US 10,242,312 B2
(45) Date of Patent: Mar. 26, 2019

(54) SYNTHETIC LOGGING FOR RESERVOIR STIMULATION

(71) Applicant: Quantico Energy Solutions LLC, Houston, TX (US)

(72) Inventor: Bruce H. Storm, Jr., Houston, TX (US)

(73) Assignee: QUANTICO ENERGY SOLUTIONS, LLC., Houston, TX (US)

(*) Notice: Subject to any disclaimer, the term of this patent is extended or adjusted under 35 U.S.C. 154(b) by 864 days.

(21) Appl. No.: 14/298,638

(22) Filed: Jun. 6, 2014

(65) Prior Publication Data
US 2015/0356403 A1 Dec. 10, 2015

(51) Int. Cl.
| | |
|---|---|
| *G06N 3/08* | (2006.01) |
| *E21B 44/00* | (2006.01) |
| *E21B 47/12* | (2012.01) |
| *E21B 49/00* | (2006.01) |
| *G01V 11/00* | (2006.01) |
| *G01V 1/48* | (2006.01) |

(52) U.S. Cl.
CPC .............. *G06N 3/08* (2013.01); *E21B 44/00* (2013.01); *E21B 47/12* (2013.01); *E21B 49/005* (2013.01); *G01V 11/00* (2013.01); *G01V 1/48* (2013.01)

(58) Field of Classification Search
CPC ......... G06N 3/08; E21B 49/005; E21B 44/00; E21B 47/12; G01V 11/00; G01V 1/48
See application file for complete search history.

(56) References Cited

U.S. PATENT DOCUMENTS

| | | | |
|---|---|---|---|
| 5,483,061 A | | 1/1996 | Sloan |
| 5,862,513 A | * | 1/1999 | Mezzatesta ............ G01V 1/282 |
| | | | 702/9 |
| 6,703,837 B1 | | 3/2004 | Wisler et al. |
| 7,036,363 B2 | | 5/2006 | Yogeswaren |
| 7,387,165 B2 | | 6/2008 | Lopez de Cardenas et al. |
| 7,587,373 B2 | * | 9/2009 | Smith, Jr. ............ G06N 3/0454 |
| | | | 706/15 |
| 7,681,642 B2 | | 3/2010 | Bell et al. |
| 7,813,935 B2 | | 10/2010 | Chitty et al. |
| 7,878,242 B2 | | 2/2011 | Gray |
| 2004/0133531 A1 | | 7/2004 | Chen et al. |
| 2010/0096187 A1 | | 4/2010 | Storm, Jr. et al. |
| 2010/0154531 A1 | | 6/2010 | Han et al. |

(Continued)

FOREIGN PATENT DOCUMENTS

| | | |
|---|---|---|
| WO | 2012174295 A2 | 12/2012 |
| WO | 2013185005 A2 | 12/2013 |

OTHER PUBLICATIONS

Alford et al., "Sonic Logging While Drilling—Shear Answers", 2012, Oilfield Review Spring 2012, 24 No. 1, pp. 4-12.*

(Continued)

*Primary Examiner* — Regis J Betsch
(74) *Attorney, Agent, or Firm* — Patterson + Sheridan, LLP

(57) ABSTRACT

The present disclosure generally relates to synthetic logging for reservoir stimulation. A synthetic logging method for stimulating a reservoir includes: training a machine learning algorithm using historical or exploratory data; and generating a synthetic elastic property log of the reservoir by supplying the trained machine learning algorithm with data acquired from a production wellbore.

15 Claims, 8 Drawing Sheets

(56) References Cited

U.S. PATENT DOCUMENTS

| | | |
|---|---|---|
| 2011/0257944 A1* | 10/2011 | Du .................. E21B 43/267 |
| | | 703/2 |
| 2014/0025301 A1 | 1/2014 | Storm, Jr. et al. |
| 2014/0034310 A1 | 2/2014 | Andersen |
| 2014/0251612 A1 | 9/2014 | Powers |

OTHER PUBLICATIONS

EPA Nuclear Logging, dated Dec. 12, 2011.
Brochure entitled "Revolution® Rotary-Steerable System—Revolutionizing drilling efficiency in all types of environments" by Weatherford, dated 2007-2009.
Brochure Layout entitled "Revolution® Rotary-Steerable Service" by Weatherford, dated 2006-2008.
PCT International Search Report and Written Opinion dated Sep. 17, 2015, for International Application No. PCT/US2015/032094.

* cited by examiner

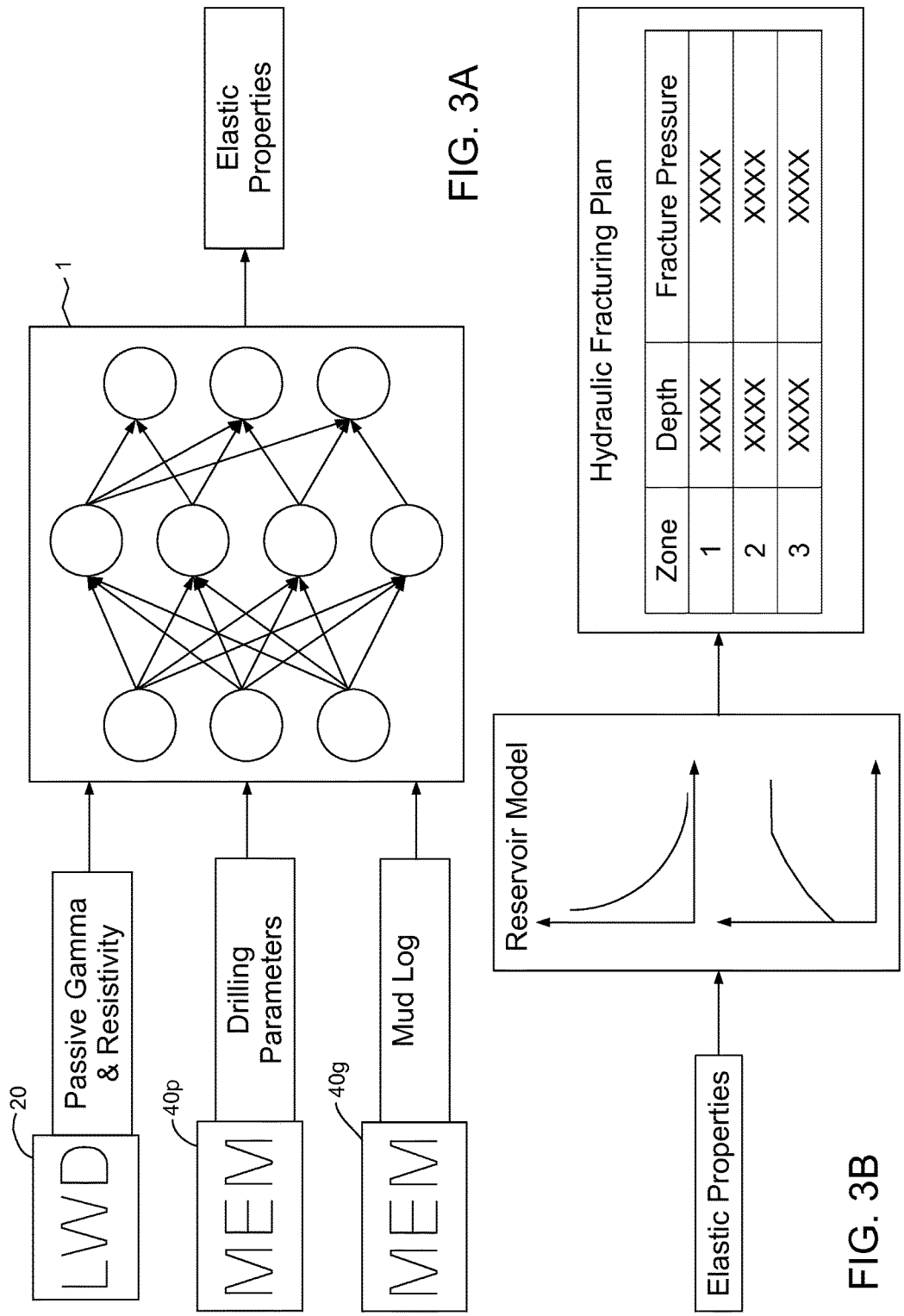

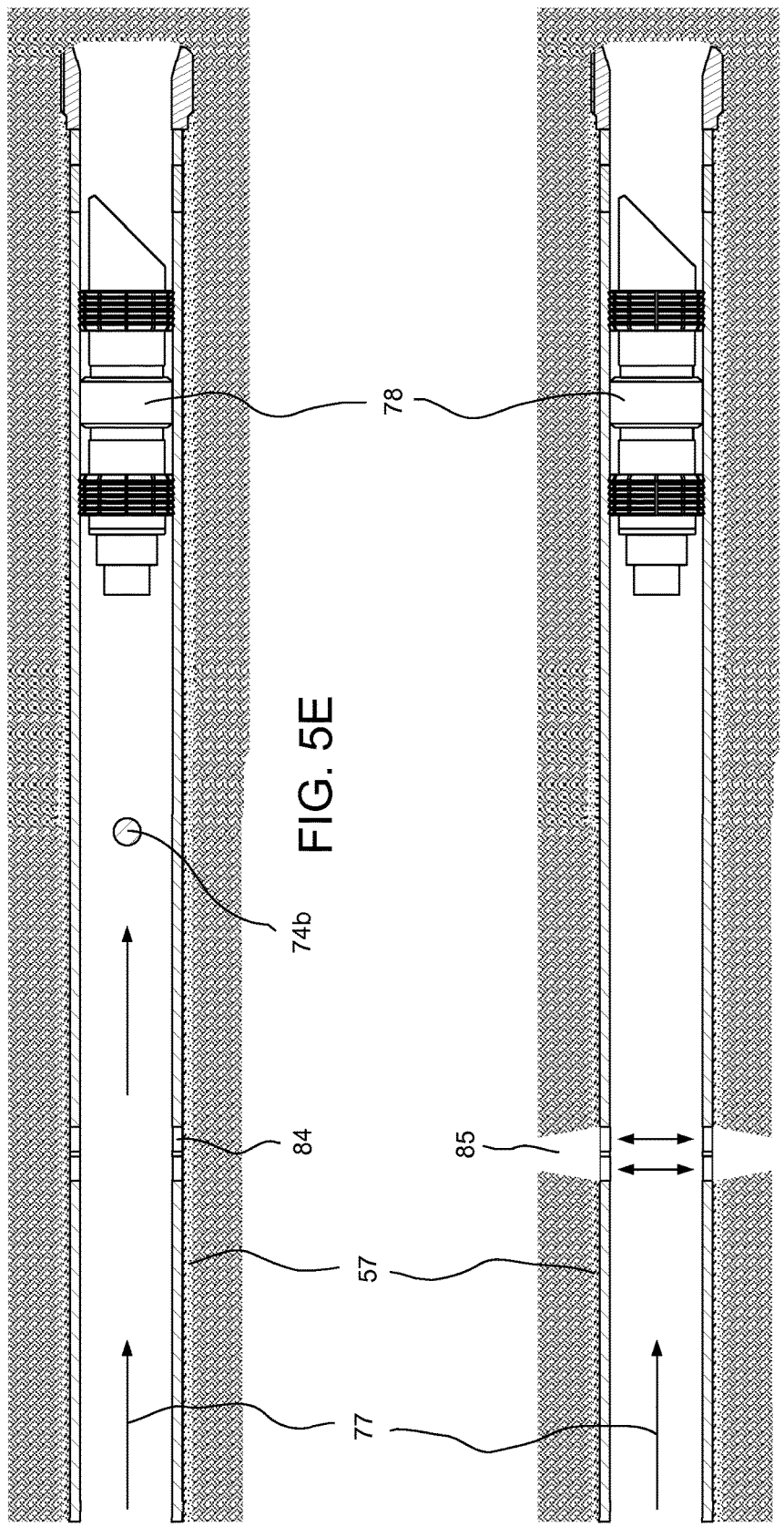

SYNTHETIC LOGGING FOR RESERVOIR STIMULATION

BACKGROUND OF THE DISCLOSURE

Field of the Disclosure

The present disclosure generally relates to synthetic logging for reservoir stimulation.

Description of the Related Art

Measurements, such as seismic surveys, may be made prior to the drilling of a well. A host of measurements may be made in the course of drilling a well (e.g. rate of penetration (ROP), weight on bit (WOB), torque, logging while drilling (LWD), measurement while drilling (MWD), mud and cuttings analysis, and gas detection and analysis). With the exception of the formation evaluation data, the data collected while drilling is seldom used after the drilling process has been completed. Additional formation evaluation measurements may be made after the well is drilled by running logging tools in the open or cased hole well. The collected data is generally stored in archives after the well is completed.

U.S. Pat. No. 7,587,373 discloses the use of a neural network to predict neutron porosity and bulk density from a non-radioisotopic pulsed neutron capture (PNC) log following training of neural networks using data from radioisotopic logs. The predicted log is used to monitor size of a natural gas cap. Even though the PNC sonde is non-radioisotopic, it utilizes deuterium and/or tritium making it an induced nuclear logging tool subject to government regulation and requiring special handling to avoid potential exposure should the tool become damaged.

SUMMARY OF THE DISCLOSURE

The present disclosure generally relates to synthetic logging for reservoir stimulation. In one embodiment, a synthetic logging method for stimulating a reservoir includes: training a machine learning algorithm (MLA) using historical or exploratory data; and generating a synthetic elastic property log of the reservoir by supplying the trained MLA with data acquired from a production wellbore.

In another embodiment, a synthetic logging method for analyzing a reservoir includes: supplying a trained machine learning algorithm with data acquired from a wellbore traversing the reservoir; and generating a synthetic log of the reservoir using the trained machine learning algorithm and the supplied data. The synthetic log is selected from a group consisting of: an elastic property log, a density log, a porosity log, and a sonic velocity log.

In another embodiment, a synthetic logging method for determining properties of a formation, includes: training a machine learning algorithm (MLA) using historical or exploratory data; and generating a synthetic elastic property log of the formation by supplying the trained MLA with data acquired from a wellbore traversing the formation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A illustrates synthesizing an elastic properties log from data collected during the LWD operation of FIG. 2A. FIG. 3B illustrates analysis of the elastic properties log to generate a hydraulic fracturing plan.

FIGS. 5A-5G illustrate hydraulic fracturing of the production wellbore using the plan.

DETAILED DESCRIPTION

Figure 1:
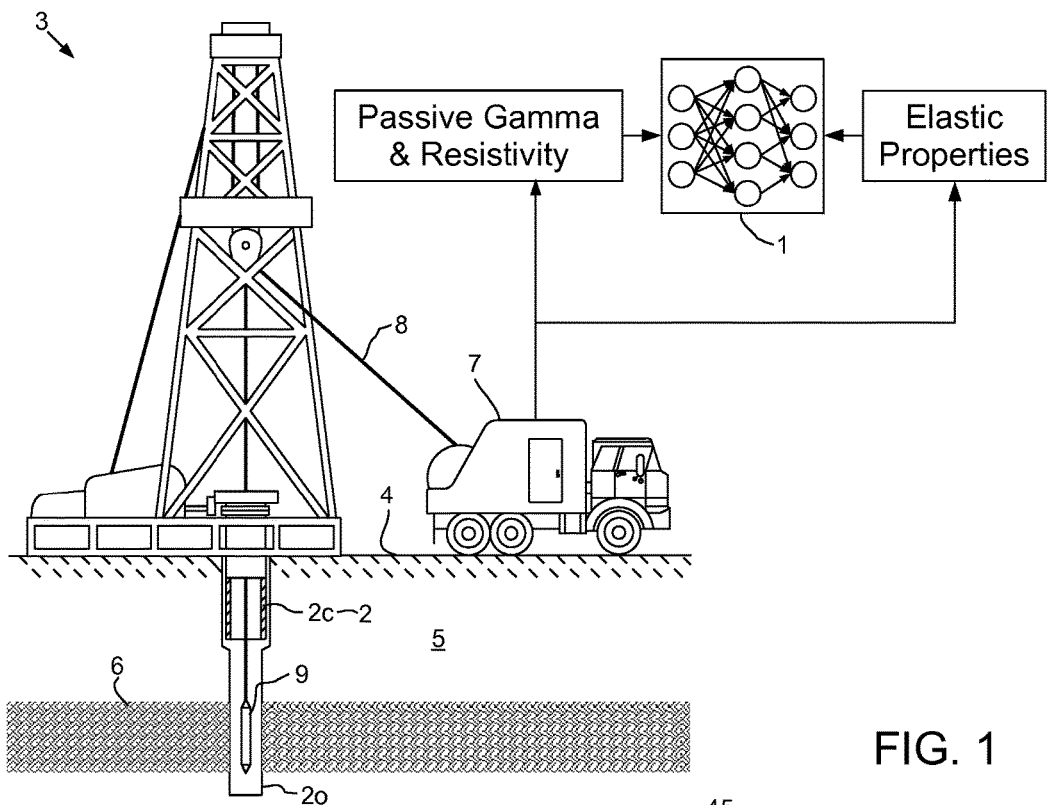
FIG. 1 illustrates a wireline logging operation for training a neural network, according to one embodiment of the present disclosure.

FIG. 1 illustrates a wireline logging operation for training a machine learning algorithm, such as an artificial neural network 1, according to one embodiment of the present disclosure. The neural network 1 may be implemented on a computer, such as a desktop, laptop, tablet, server, or mainframe. The operation may be conducted in an exploratory wellbore 2 drilled using a terrestrial drilling system 3. The exploratory wellbore 2 may be vertical and have a cased section 2c and an open hole section 2o. The exploratory wellbore 2 has been drilled from a surface 4 of the earth, through an upper nonproductive formation 5, and into or through a lower hydrocarbon-bearing (i.e., crude oil and/or natural gas) reservoir 6. The reservoir 6 may be unconventional, such as shale.

A wireline truck 7 may be deployed to the wellsite. The wireline truck 7 may include a control room, a generator, a frame, and a winch having a deployment cable, such as wireline 8, wrapped therearound. The wireline 8 may be fed through a traveling block of the drilling system 3 and the winch operated to lower a logging tool 9 to a portion of the open hole section 2o traversing the reservoir 6. The wireline 8 may include one or more electrical conductors for supplying the logging tool 9 with power and communicating data from the logging tool to the control room of the truck 7. The wireline 8 may also include one or more layers of armor for supporting its own weight and that of the logging tool 9.

The logging tool 9 may include one or more induced nuclear sondes, such as a PNC sonde (aka pulsed neutron lifetime (PNL) sonde and/or carbon/oxygen sonde), density (aka gamma-gamma) sonde, and neutron porosity sonde. The logging tool 9 may also include one or more passive (aka natural) nuclear sondes, such as a gamma ray sonde and a spectral gamma ray sonde. The logging tool 9 may also include one or more nonnuclear sondes, such as a spontaneous potential (SP) sonde, resistivity sonde, a sonic sonde, nuclear magnetic resonance sonde, a caliper sonde, and a temperature sonde. Depth of the logging tool 9 may be monitored by a position sensor in communication with the winch. A cablehead may connect the logging tool 9 to the wireline 8 and include a load cell for monitoring tension in the wireline to compensate the measured depth for tension induced extension thereof. The logging tool 9 may be located at a vertical end of the reservoir 6 and operated while raising or lowering the logging tool to the other vertical end of the reservoir.

Once the logging run has been completed, the logging tool 9 may be recovered from the wellbore 2 and the measured data processed to determine one or more elastic property logs (aka mechanical property log or rock strength log) of the reservoir 6, such as Poisson's ratio, Young's modulus, shear modulus, bulk modulus, Biot's constant, Lame's constant, modulus of compressibility, brittleness index, and rock strength. The measured data may also be processed to determine one or more other property logs of the reservoir 6, such as a density log, a sonic velocity log (shear and/or compressional), and a production index log. The determined logs may then be used to train the neural network 1 for synthesizing one or more of the elastic property logs using data logged by one or more of the passive nuclear sondes and the nonnuclear sondes (no induced nuclear sondes).

Alternatively, the measured wireline tension may also be used to train the neural network 1. Alternatively, the neural network 1 may be trained using historical data collected from similar reservoirs. Alternatively, the neural network 1 may be trained using the historical data and calibrated using the logging data from the exploratory wellbore 2. Alternatively, the cased 2c and/or open hole 2o section of the exploratory wellbore 2 may be deviated, such as slanted or horizontal. Alternatively, the open hole section 2o may be cased for the logging operation. Alternatively, the reservoir 6 may be logged while drilling the open hole section 2o.

Figure 2B:
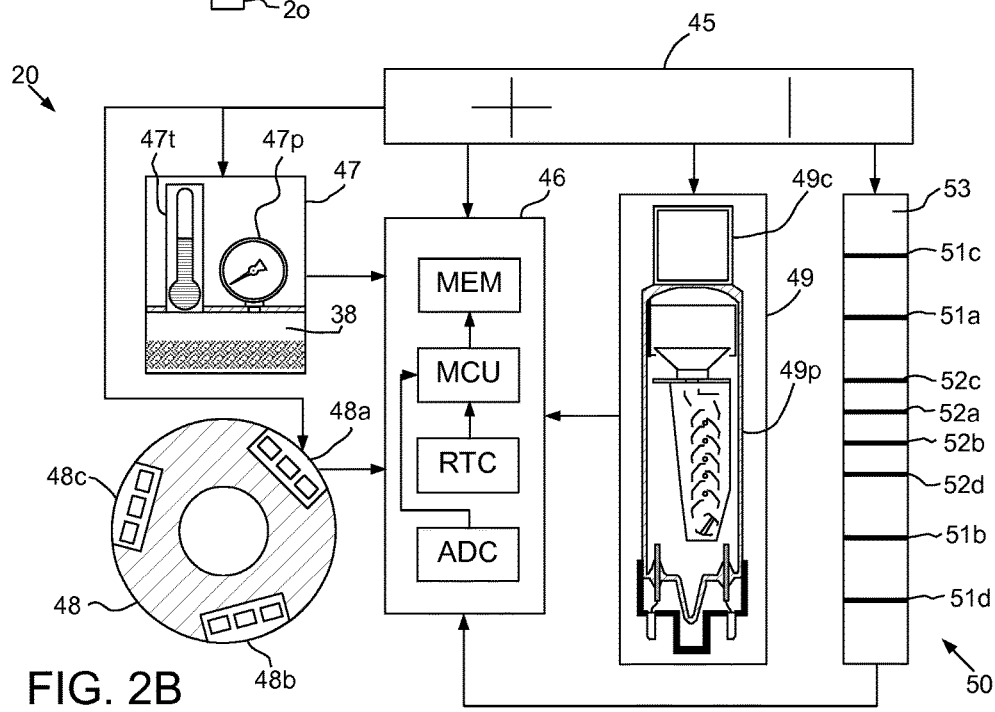
FIG. 2B illustrates a LWD tool of FIG. 2A.
Figure 2A:
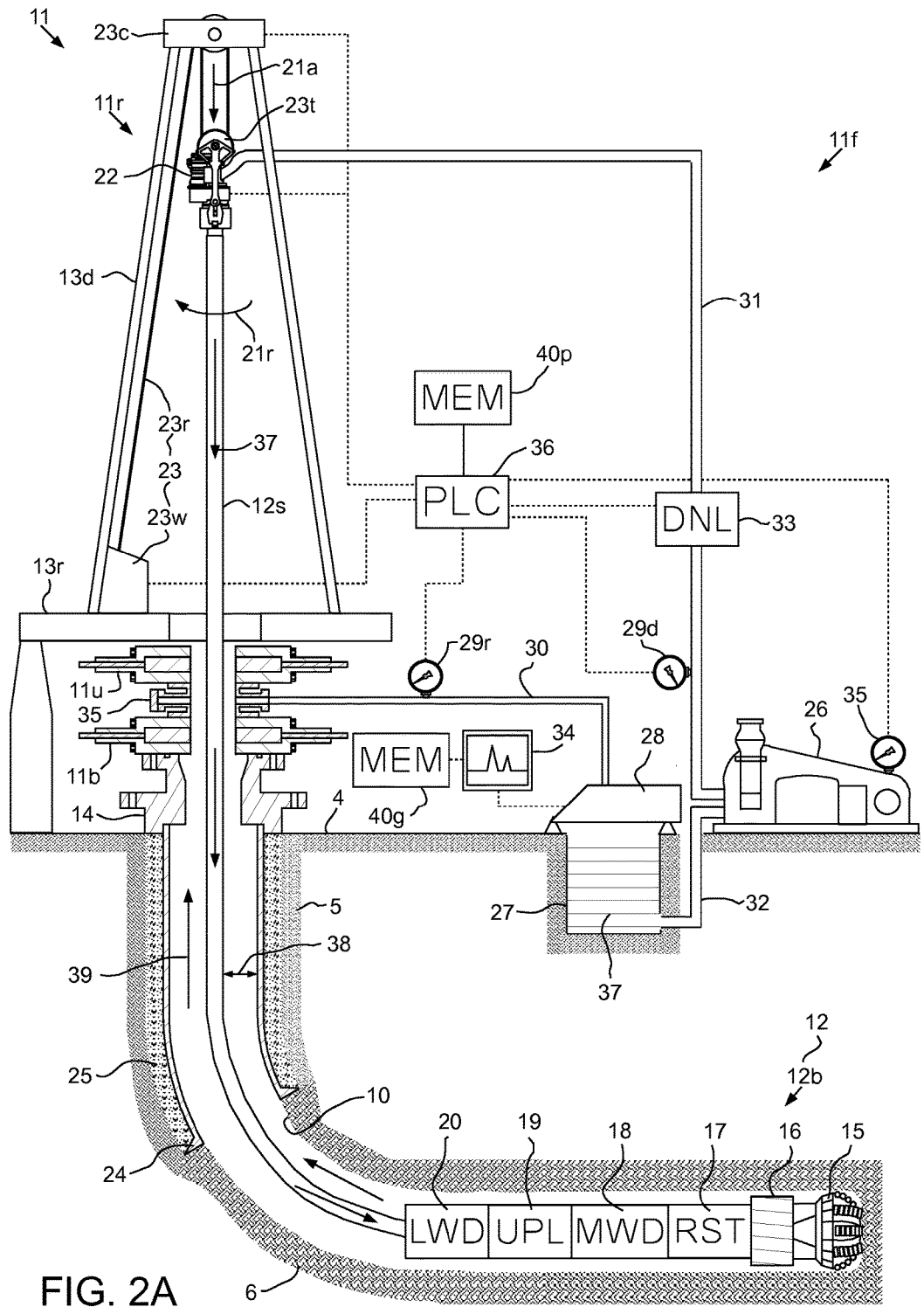
FIG. 2A illustrates logging while drilling (LWD) a production wellbore.

FIG. 2A illustrates logging while drilling (LWD) a production wellbore 10. The LWD operation may be conducted in the production wellbore 10 using a terrestrial directional drilling system 11 such that the production wellbore has a deviated, such as horizontal, lower portion. An upper portion of the production wellbore 10 may be vertical (shown) or slanted. The directional drilling system 11 may include a drilling rig 11r, a fluid handling system 11f, one or more blowout preventers (BOPs) 11u,b, and a drill string 12. The drilling rig 11r may include a derrick 13d, top drive 22, draw works 23, and a floor 13r at its lower end having an opening through which the drill string 12 extends downwardly into the production wellbore 10 via the BOPs 11u,b. The BOPs 11u,b may be connected to a wellhead 14.

The drill string 12 may include a bottomhole assembly (BHA) 12b and a drill stem 12s. The drill stem 12s may include joints of drill pipe connected together, such as by threaded couplings. The BHA 12b may be connected to the drill stem 12s, such as by threaded couplings, and include a drill bit 15, a near bit stabilizer 16, a rotary steering tool (RST) 17, a measurement while drilling (MWD) tool 18, a telemetry uplink (UPL) 19, and the LWD tool 20. The BHA members 15-20 may be interconnected, such as by threaded couplings. The drill bit 15 may be rotated 21r by the top drive 22 via the drill stem 12s.

Alternatively, the BHA 12b may include a drilling motor in addition to the RST 17. Alternatively, the drill stem 12s may be coiled tubing.

The MWD tool 18 may include a mandrel having threaded couplings formed at each longitudinal end thereof, an electronics package mounted on the mandrel, a sensor package mounted on the mandrel, a housing connected to the mandrel to protect the packages, and a battery disposed between the housing and the mandrel. The electronics package may include a microcontroller (MCU), a clock, and an analog to digital converter. The electronics package and sensor package may be in electrical communication by leads, a bus, or integration on a printed circuit board. The sensor package may include one or more pressure sensors, such as a bore pressure sensor and an annulus pressure sensor, an angular speed sensor, an inclination sensor, and an azimuth sensor.

The angular speed sensor may include one or more single axis accelerometers. The accelerometers may be piezoelectric, magnetostrictive, servo-controlled, reverse pendular, or microelectromechanical. The accelerometers may be radially oriented relative to the mandrel to measure the centrifugal acceleration due to rotation thereof for determining the angular speed and spaced around the mandrel to account for centrifugal acceleration due to lateral vibration and/or gravity. The inclination sensor may be oriented along a longitudinal axis of the mandrel to measure inclination relative to gravitational direction. The inclination sensor may also be any of the single axis accelerometers. The azimuth sensor may include one or more, such as three orthogonally oriented, magnetometers.

Alternatively, the angular speed sensor and/or the inclination sensor may be a gyroscope or magnetometer. Alternatively, the sensor package may further include an angular acceleration sensor. Alternatively, the sensor package may further include a load cell for measuring WOB.

The MWD electronics package may further include a modem in electrical communication with the UPL 19 for operation thereof to send measurements by the sensor package to a programmable logic controller (PLC) 36. Each of the UPL 19 and a telemetry downlink (DNL) 33 may be a mud pulser. The modem may also be in data communication with the bore pressure sensor to receive mud pulses from the DNL 33 for communication of steering instructions from the PLC 36.

Alternatively, the UPL 19 may be a gap sub and the DNL 33 may be a casing antenna for electromagnetic telemetry instead of mud pulse. Alternatively, the drill stem 12s may be wired with a pair of electrical conductors to supply the BHA 12b with power and provide data communication between the BHA and the PLC 36.

The MWD MCU may also be in electrical communication with the RST 17. The RST 17 may include a mandrel having threaded couplings formed at each longitudinal end thereof and a housing having an actuator and a plurality of levers spaced therearound, such as three spaced at one hundred twenty degree intervals. The housing may be supported from the mandrel by bearings such that the housing may remain rotationally stationary relative to the mandrel. The actuator may include a hydraulic pump driven by relative rotation between the housing and the mandrel and a piston connected to each lever, a cylinder keeping each piston, and a manifold selectively providing fluid communication between each piston and the pump for extension or retraction of the respective lever. The MWD MCU may receive steering instructions from the PLC 36 and operate one or more of the levers to point the bit 15 along the instructed path.

Alternatively, the BHA 12b may further include a bent sub and drilling motor instead of the RST 17 and the drilling motor may rotate the drill bit 15 while the drill stem 12s is selectively rotated to shift between a sliding mode and a rotary mode. Alternatively, the RST 17 may be a push type and the near bit stabilizer 16 may be omitted.

An upper end of the drill stem 12s may be connected to a quill of the top drive 22. The top drive 22 may include a motor for rotating 21r the drill string 12. The top drive motor may be electric or hydraulic. A frame of the top drive 22 may be coupled to a rail (not shown) of the derrick 13d for preventing rotation of the top drive frame during rotation 21r of the drill string 12 and allowing for vertical movement of the top drive with a traveling block 23t. The frame of the top drive 22 may be suspended from the derrick 2 by the traveling block 23t. The traveling block 23t may be supported by wire rope 23r connected at its upper end to a crown block 23c. The wire rope 23r may be woven through sheaves of the blocks 23c,t and extend to a winch 23w for reeling thereof, thereby raising or lowering the traveling block 23t relative to the rig floor 13r.

The wellhead 14 may be mounted on a casing string 24 which has been deployed into the production wellbore 10 and cemented 25 therein. The casing string 24 may have a shoe located adjacent a boundary between the upper formation 5 and the reservoir 6.

Alternatively, the exploratory wellbore 2 and production wellbore 10 may be subsea having a wellhead located adjacent to the waterline and the drilling rig 11r may be a located on a platform adjacent the wellhead. Alternatively, the wellbores 2, 10 may be subsea having a wellhead located adjacent to the seafloor and a marine riser may connect the wellhead to an offshore drilling unit. Alternatively, a Kelly and rotary table may be used to rotate the drill stem 12s instead of the top drive 22. Alternatively, the upper portion of the production wellbore 10 may be logged during or after drilling and the logging data therefrom used to train and/or calibrate the neural network 1.

The fluid system 11f may include a mud pump 26, a drilling fluid reservoir, such as a pit 27 or tank, a solids separator, such as a shale shaker 28, one or more pressure sensors 29d,r, one or more flow lines, such as a return line 30, a supply line 31, and a feed line 32, the DNL 33, a mud logging tool 34, and a stroke counter 35. A first end of the return line 30 may be connected to a flow cross 35 mounted on the wellhead 14 and a second end of the return line may be connected to an inlet of the shaker 28. The returns pressure sensor 29r may be assembled as part of the return line 29. A lower end of the supply line 31 may be connected to an outlet of the mud pump 26 and an upper end of the supply line may be connected to an inlet of the top drive 22. The supply pressure sensor 29d and the DNL 33 may be assembled as part of the supply line 31.

Each pressure sensor 29d,r may be in data communication with the PLC 36. The returns pressure sensor 29r may be operable to monitor wellhead pressure and the supply pressure sensor 29d may be operable to monitor standpipe pressure. The stroke counter 35 may also be in data communication with the PLC 36 and may be operable to monitor a flow rate of the mud pump 26. The PLC 36 may also be in communication with a hook load detector (depicted by dotted line to crown block 23c) clamped to the wire rope 23r, and a position sensor of the winch 23w for monitoring depth of the BHA 12b. The PLC 36 may further be in communication with a torque sensor and tachometer of the top drive 22. The PLC 36 may know parameters of the drill string 12 for calculating WOB. The drill string parameters may further include drill bit type and drill bit size. The PLC 36 may also calculate ROP. The PLC 36 may record the various measurements and calculations in a memory unit (MEM) 40p for later use. The drill string parameters may also be recorded in the MEM 40p for later use.

To extend the wellbore 10 from the casing shoe into the reservoir 6, the mud pump 26 may pump drilling fluid 37 from the pit 27, through the supply line 31, and to the top drive 22. The drilling fluid 37 may include a base liquid. The base liquid may be refined or synthetic oil, water, brine, or a water/oil emulsion. The drilling fluid 37 may further include solids dissolved or suspended in the base liquid, such as organophilic clay, lignite, and/or asphalt, thereby forming a mud.

Alternatively, the drilling fluid 37 may further include a gas, such as diatomic nitrogen mixed with the base liquid, thereby forming a two-phase mixture. Alternatively, the drilling fluid may be a gas, such as nitrogen, or gaseous, such as a mist or foam. If the drilling fluid 37 includes gas, the drilling system 1 may further include a nitrogen production unit (not shown) operable to produce commercially pure nitrogen from air.

The drilling fluid 37 may flow from the supply line 31 and into a bore of the drill stem 12s via the top drive 22. The drilling fluid 37 may flow down the drill stem 12s, through a bore of the BHA 12b, and exit the drill bit 15, where the fluid may circulate cuttings away from the bit and return the cuttings up an annulus 38 formed between an inner surface of the casing 24 or wellbore 10 and an outer surface of the drill string 12. The returns 39 (drilling fluid 37 plus cuttings) may flow up the annulus 38, to the wellhead 14, and exit the wellhead through the flow cross 35. The returns 39 may continue through the return line 30. The returns 39 may then flow into the shale shaker 28 and be processed thereby to remove the cuttings, thereby completing a cycle. As the drilling fluid 37 and returns 39 circulate, the drill string 12 may be rotated 21r by the top drive 22 and lowered 21a by the traveling block 23c, thereby extending the wellbore 10 into the reservoir 6.

As the drilling fluid 37 is being pumped into the production wellbore 10 by the mud pump 26 and the returns 39 are being received from the return line 30, the mud logging tool 34 may analyze the cuttings. The mud logging tool 34 may include an extractor for separating gas entrained in the cuttings, a gas analyzer, and a carrier system for delivering the gas sample to the analyzer. The gas analyzer may be a chromatograph or optical analyzer. The mud logging tool 34 may further include a source rock analyzer (SRA) for elemental analysis and/or mineral composition of the cuttings. The SRA may include a pyrolyzer, such as an oven or laser, an infrared cell, and a flame ionization detector. The measurements by the mud logging tool 34 may be recorded in a MEM 40g for later use. Parameters of the drilling fluid 37, such as density (aka mud weight) and resistivity may be measured by the mud logging tool and/or input by the mud engineer and stored in the MEM 40g for later use.

An equivalent circulation density (ECD) of the drilling fluid 37 may be greater than a pore pressure gradient of the reservoir 6 such that an overbalanced condition is maintained during drilling thereof.

Alternatively, the ECD of the drilling fluid 37 may be less than or equal to the pore pressure gradient such that a balanced or underbalanced condition is maintained during drilling of the reservoir 6. For balanced or underbalanced drilling, the drilling system may further include a rotating control device connected to the wellhead 14 (above the flow cross 35) and having a rotating seal engaged with the drill stem 12s. In this alternative, the drilling system 11 may further include a variable choke valve assembled as part of the return line 30 and in communication with the PLC 36 for operation thereby and a mud-gas separator (MGS) assembled as part of the return line 30. In this alternative, the gas analyzer may then be in communication with a gas outlet of the MGS, thereby obviating the need for an extractor.

FIG. 2B illustrates the LWD tool 20. The LWD tool 20 may include a control module 45-48 and one or more passive nuclear or non-nuclear sondes, such as a gamma sonde 49 and a resistivity sonde 50. The sondes 49, 50 may each be in electrical communication with the control module 45-48, such as by wired threaded couplings. The LWD tool 20 may be operated to log the reservoir 6 during drilling of the reservoir and/or while retrieving (aka tripping out) the BHA 12b from the production wellbore 10 after drilling has been completed.

Alternatively, a logging tool may be deployed into the production wellbore 10 using wireline after the reservoir 6 has been drilled and the drill string 12 retrieved from the wellbore. Alternatively, the logging tool may be deployed through the drill stem 12s after drilling has finished but before removal of the drill string 12 from the production wellbore 10 by including a drill bit having a removable inner portion or by adding a disconnect tool to the BHA 12b. In this alternative, the BHA/drill bit inner portion may be released at a bottom of the production wellbore and the logging tool may be deployed through the drill stem 12s using wireline and a tractor or may be pumped down to assist wireline deployment or pumped down without wireline. In this alternative, once the logging tool reaches a bottom of the drill stem 12s, the reservoir may be logged by retrieving the drill stem until the bottom reaches the casing shoe. In this alternative, once the reservoir 6 has been logged, the logging tool may be retrieved to the rig 11r and the drill stem 12s may be lowered and reconnected to the BHA/drill bit inner portion.

The control module 45-48 may include a mandrel having threaded couplings formed at each longitudinal end thereof, an electronics package 46 mounted on a housing, the housing connected to the mandrel, a sensor package 47, 48 mounted on the housing, and a battery 45 disposed between the housing and the mandrel. The electronics package 46 may include a MCU, a clock (RTC), an analog to digital converter (ADC), and a MEM. The MEM may be a solid state drive. The electronics package 46 may additionally include a power converter for inverting a power signal from the battery 45 to an appropriate power signal for supplying the caliper 48. The electronics package 46 and sensor package 47, 48 may be in electrical communication by leads, a bus, or integration on a printed circuit board. The sensor package 47, 48 may include an annulus pressure sensor 47p, an annulus temperature sensor 47t, and a solid state caliper 48.

The caliper 48 may include one or more ultrasonic sensors 48a-c spaced around the control module housing, such as three spaced at one hundred twenty degree intervals, each sensor having a sensor block housing one or more (three shown) piezoelectric transducer elements. Alternatively, the transducer elements may be magnetostrictive. A central transducer element of each sensor 48a-c may be oriented to have a sensitive axis along a radial axis of the control module and may be operable to both transmit and receive ultrasonic waves in a pulse echo mode. Peripheral transducer elements of each sensor 48a-c may straddle the respective central transducer element and each be operable to receive the respective ultrasonic waves reflected from a wall of the production wellbore 10 in a pitch catch mode. The MCU may receive the reflection measurements from the transducer elements during drilling and record the measurements in the MEM for later processing to determine a size and shape of a lower portion of the production wellbore 10.

The passive gamma sonde 49 may include a drill collar and a detector 49c,p mounted in a pocket formed in an outer surface of the drill collar. Alternatively, the sonde 49 may include a plurality of detectors 49c,p spaced around the drill collar, such as three at one hundred twenty degree intervals. The detector 49c,p may include a solid-state scintillation crystal 49c, such as a sodium iodide crystal, in optical communication with a photomultiplier tube 49p. In operation, gamma rays naturally emitted by the reservoir 6 may be absorbed by the crystal 49c which may in turn emit a flash of light for each absorption. Each light flash may be converted into an electrical pulse by the photomultiplier tube 49p. The MCU may count the pulses and record the count in the MEM. Additionally, the MCU may record the size of the pulses and record the sizes for later spectral analysis.

The resistivity sonde 50 may include a plurality of transmitters 51a-d and a plurality of receivers 52a-d disposed along an outer surface of a drill collar 53. The drill collar may be made from a nonmagnetic metal or alloy, such as austenitic stainless steel or nickel based alloy. The resistivity sonde 50 may further include a power converter (not shown) for inverting a power signal from the battery 45 to appropriate power signals for supplying the transmitters 51a-d. Each of the transmitters 51a-d and receivers 52a-d may be coil antennas. The transmitters 51a-d and receivers 52a-d may be operated in pairs to transmit electromagnetic signals into the reservoir 6, such as a first pair including transmitters 51a,b and receivers 52a,b and a second pair including transmitters 51c,d and receivers 52c,d. For each pair, each receiver 52a-d may be longitudinally spaced from the other receiver by a first constant distance and each transmitter 51a-d may be longitudinally spaced from a respective receiver 52a-d by a second constant distance. The second constant distance may be greater or substantially greater than the first constant distance, such as two-ten times the first constant distance.

The electromagnetic signals may have a frequency in the range of one hundred kHz to ten MHz. Each pair of transmitters 51a-d may simultaneously transmit a first signal at a high frequency, such as greater than one MHz, and a second signal at a substantially lower frequency, such less than or equal to one MHz. For each pair, a first transmitter 51a,c may transmit at the high frequency and a second transmitter 51b,d may transmit at the lower frequency and then the transmitters may be reversed or the first transmitter may transmit at both frequencies while the second transmitter is idle and then the second transmitter may be operated to transmit at both frequencies while the first transmitter is idle.

The high frequency signals may penetrate the reservoir 6 to a relatively shallow radial distance and the lower frequency signals may penetrate the reservoir to a deeper radial distance. The receivers 52a-d may measure signal phase and attenuation which may be stored in the MEM by the MCU and later processed to compensate for factors having adverse effects on the measurements, such as fluid invasion and variations in wellbore size. The compensated signal phase and attenuation values may then be used to calculate a resistivity log for the reservoir 6.

Alternatively, the LWD tool 20 may include any of the other nonnuclear sondes discussed above instead of or in addition to the resistivity sonde 50 and/or the passive gamma sonde 49.

FIG. 3A illustrates synthesizing an elastic properties log from data collected during the LWD operation of FIG. 2A. FIG. 3B illustrates analysis of the elastic properties log to generate a hydraulic fracturing plan. Once drilling of the reservoir 6 has been completed and the drill string 12 retrieved to the rig 11r, the logging and drilling data may be retrieved from the LWD MEM, the PLC MEM 40p, and the mud logging tool MEM 40g. The logging and drilling data may be supplied to the trained neural network 1. The trained neural network 1 may then generate a synthesized elastic properties log of the reservoir 6. The synthesized elastic properties log may then be supplied to a reservoir model and the reservoir model may generate a stimulation plan for the reservoir 6. The stimulation plan may be a hydraulic fracturing plan. The fracturing plan may identify a number of production zones and, for each zone, list a setting depth of a fracture plug and a depth of perforation. Although not illustrated, the fracturing plan may also include a quantity of fracturing fluid to be used for each zone and mixture parameters for the fracturing fluid for each zone. The reservoir model may be implemented on the same computer as the neural network 1 or on a different computer. Training of the neural network 1 and generation of the synthesized elastic properties log may be implemented on the same or different computers.

Alternatively or additionally, the trained neural network 1 may be used to generate one or more other property logs of the reservoir 6, such as a density log, a sonic velocity log, porosity log, and a production index log. Alternatively, the LWD tool 20 may be omitted and the drilling parameters, mud log, and seismic data (all of which may be measured at surface 4) may be supplied to the trained neural network 1 for generation of the synthetic elastic and/or other properties log. Alternatively, the MWD tool 18 may include a memory unit for recording any or all of the measurements made by the sensors thereof and the MWD data retrieved from the memory unit and supplied to the trained neural network 1.

Figure 4:
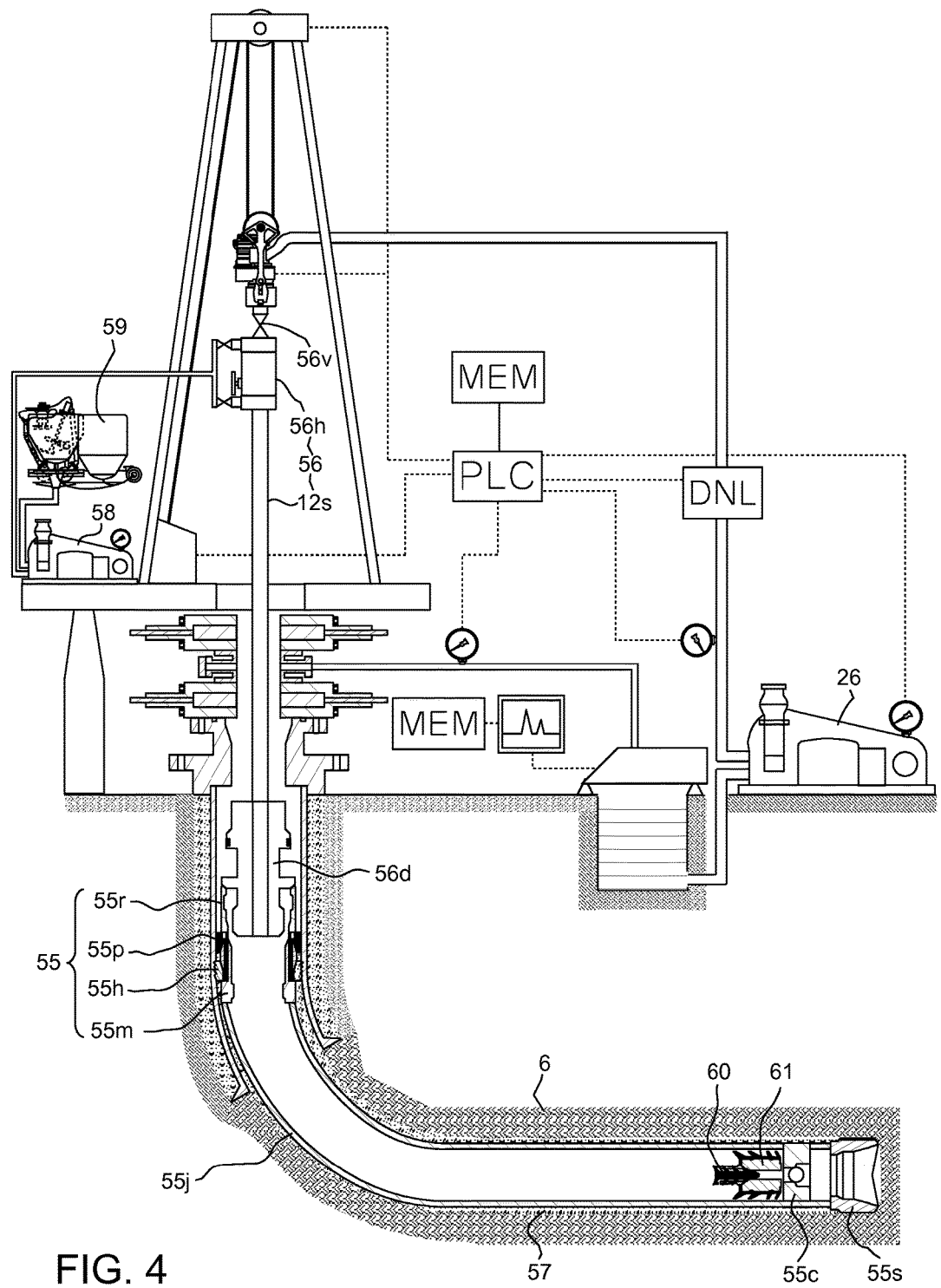
FIG. 4 illustrates lining of the production wellbore.
Figure 5A:
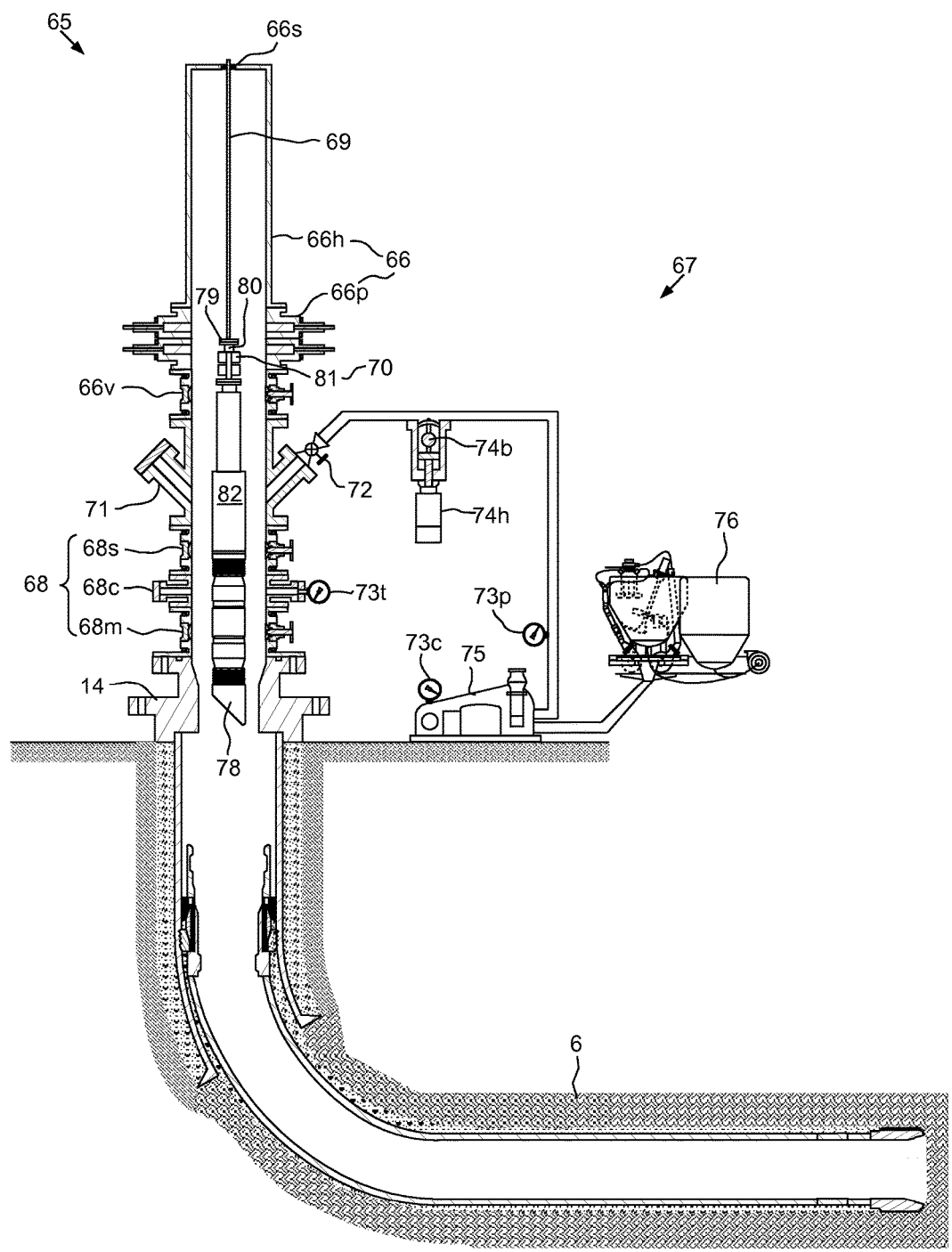
Figure 5B:
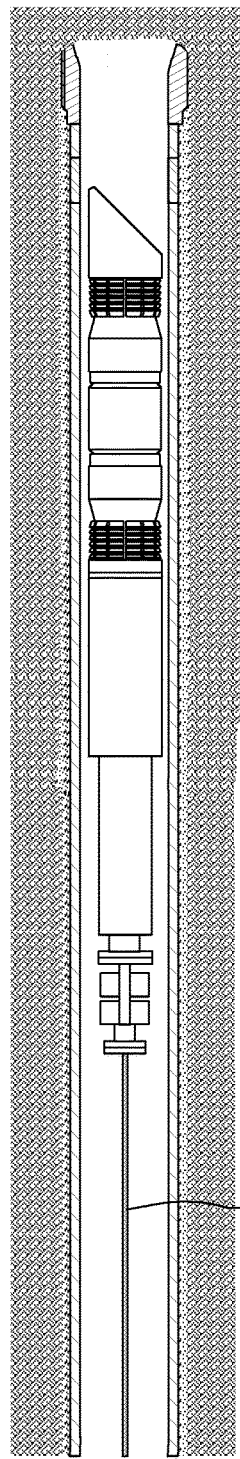
Figure 5C:
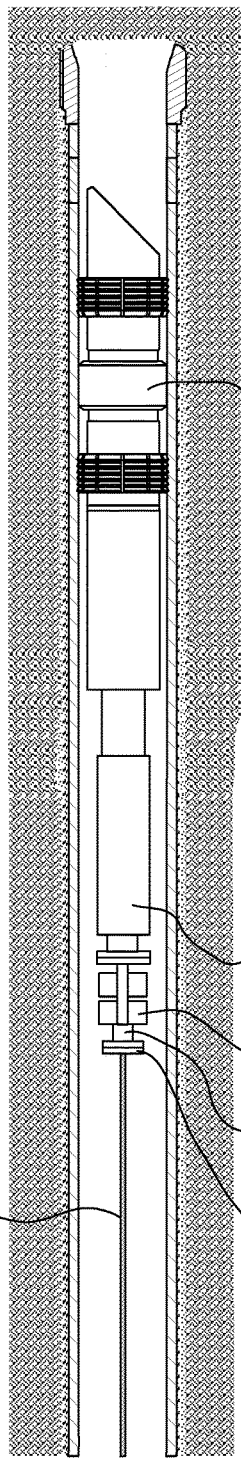
Figure 5D:
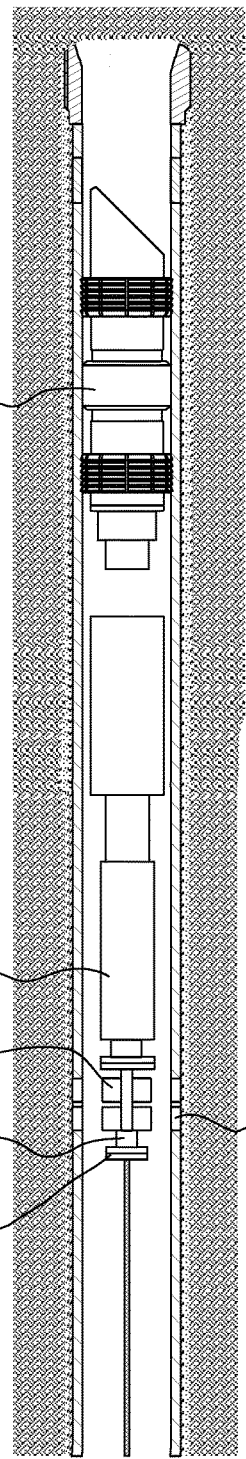
Figure 5G:
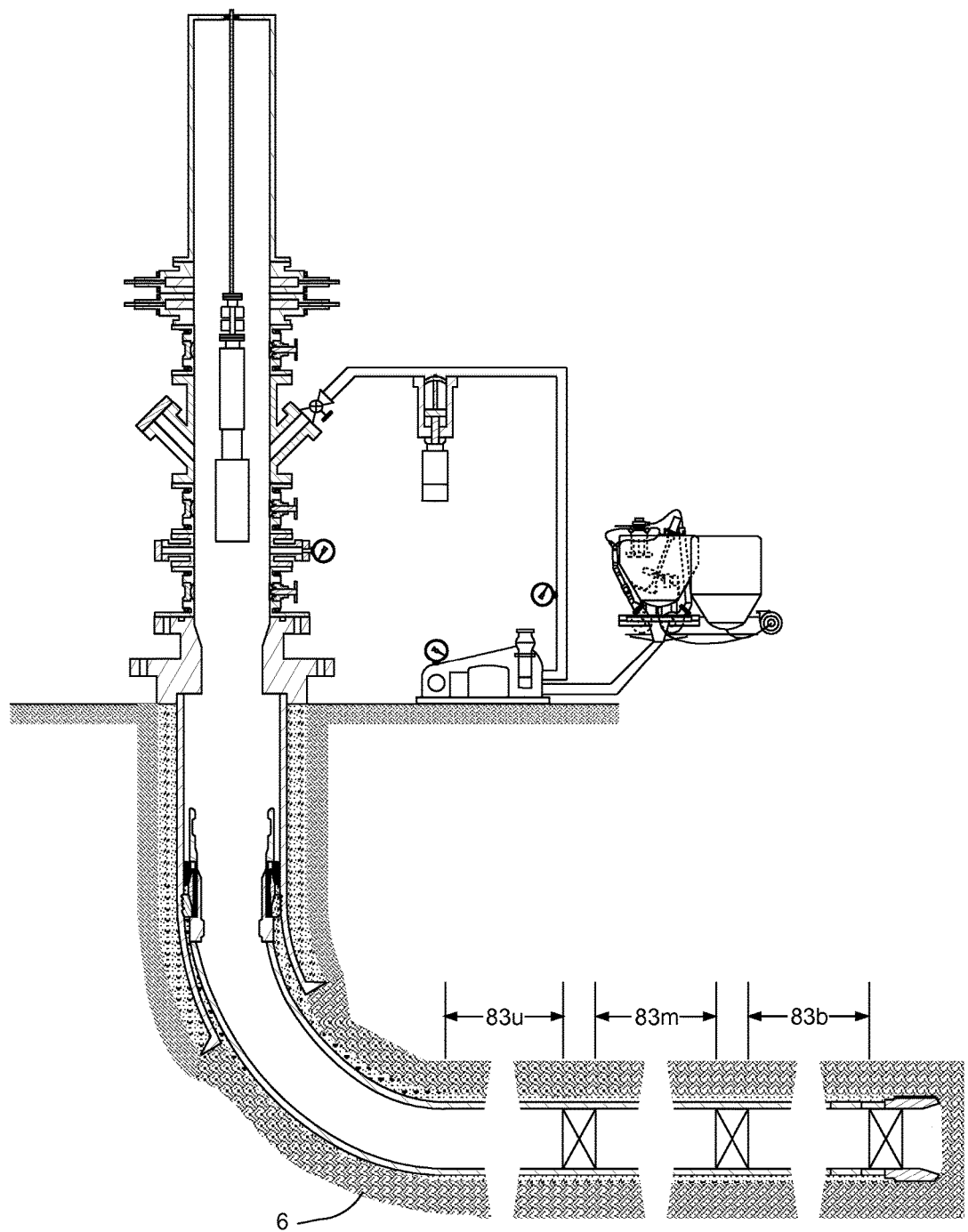

FIG. 4 illustrates lining of the production wellbore 10. The production wellbore 10 may be lined during or after generation of the fracturing plan. A liner string 55 may be assembled using the drilling rig 11r and a workstring 56 used to deploy the liner string into the production wellbore 10. The liner string 55 may include a polished bore receptacle (PBR) 55r, a packer 55p, a hanger 55h, a mandrel 55m for carrying the hanger and packer, joints of liner 55j, a float collar 55c, and a reamer shoe 55s. The mandrel 55m, liner joints 55j, float collar 55c, and reamer shoe 55s may be interconnected, such as by threaded couplings. The workstring 56 may include a liner deployment assembly (LDA) 56d, the drill stem 12s, a cementing head 56h, and an isolation valve 56v. An upper end of the LDA 56d may be connected to a lower end the drill stem 12s, such as by threaded couplings. The LDA 56d may also be releasably connected to the mandrel 55m.

Once the liner string 55 has been deployed to a depth adjacent the reservoir 6, a setting plug (not shown), such as a ball, may be launched and pumped down the drill stem 12s to the LDA 56d. The setting plug may land in a seat of the LDA 56d and continued pumping may increase pressure in the drill stem 12s and an upper bore of the LDA 56d until the liner hanger 55h is set and the LDA is released from the liner string 55. The setting plug may then be released from the seat and stowed in a catcher of the LDA 56d. A cement pump 58 may be operated to pump cement slurry 57 may from a mixer 59 and into the drill stem 12s via the cement head 56h. Once a desired quantity of cement slurry 57 has been injected into the drill stem 12s, the cement head 56h may be operated to launch a cementing plug, such as a dart 60.

The isolation valve 56v may be opened and the mud pump operated to pump chaser fluid (not shown) into the drill stem 12s, thereby driving the dart 60 and cement slurry 57 through the drill stem and into a bore of the liner string 55 until the dart seats in a wiper plug 61 of the LDA 56d. Continued pumping of the chaser fluid may increase pressure to release the wiper plug 61 from the LDA 56d and drive the cement slurry 57, wiper plug 61, and dart 60, down the liner string bore. The cement slurry 57 may driven through the float collar 55c and reamer shoe 55s and into the annulus until the wiper plug 61 bumps the float collar 55c. Pumping of the chaser fluid may then cease and the float collar 55c may close to prevent back flow of the cement slurry into the liner string bore. The LDA 56d may then be operated to set the packer 55p by articulation of the drill stem 12s. The workstring 56 may then be retrieved to the rig 11r and the drilling system 11 dispatched from the well site.

FIGS. 5A-5G illustrate hydraulic fracturing of the production wellbore 10 using the fracturing plan. A fracturing system 65 may be deployed once the rig 11r has been dispatched from the wellsite. The fracturing system 65 may include a lubricator 66, a fluid system 67, a production tree 68, a deployment cable, such as wireline 69, and a BHA 70.

The production tree 68 may be installed on the wellhead 14. The production tree 68 may include a master valve 68m, a flow cross 68c, and a swab valve 68s. A workstring (not shown), such as coiled tubing and an additional BHA, may be deployed into the production wellbore 10 using a coiled tubing unit (CTU) (not shown). The CTU may include an injector, a reel of the coiled tubing, a tool housing, a stuffing box, one or more BOPs and a shutoff valve. The BHA may include a milling motor and a mill bit. The injector may be operated to lower the coiled tubing and BHA into the production wellbore 10 and the fracture pump 75 operated to inject milling fluid through the BHA, thereby driving the milling motor to rotate the mill bit. The mill bit may be lowered into engagement with the dart 60, wiper plug 61, float collar 55c, and reamer shoe 55s and milling fluid discharged from the mill bit may carry the debris therefrom to the surface 4 for disposal. The BHA and coiled tubing may then be retrieved from the production wellbore 10 and the CTU removed from the tree 68.

Alternatively, the dart 60, wiper plug 61, float collar 55c, and reamer shoe 55s may be milled out after fracturing the reservoir 6 or left in place.

The fluid system 67 may include the injector head 71, a shutoff valve 72, one or more gauges, such as the pressure gauges 73p,t and a stroke counter 73c, a launcher 74h, the fracture pump 75, and a fracture fluid mixer 76. The injector head 71 may be installed on the production tree 68 and the lubricator 66 may be installed on the injector head. The pressure gauge 73t may be connected to the flow cross 68c and may be operable to monitor wellhead pressure. The pressure gauge 73p may be connected between the fracture pump 76 and the valve 72 and may be operable to measure discharge pressure of the fracture pump 76. The stroke counter 73c may be operable to measure a flow rate of the fracture pump 76.

Alternatively, the gauges may be sensors in data communication with a programmable logic controller (PLC) (not shown) for automated or semi-automated control of the fracturing operation.

The launcher 74h may include a housing, a plunger, and an actuator. A closing plug, such as a ball 74b, may be disposed in the plunger for selective release and pumping downhole to close a bore of a frac plug 78 of the BHA 70. The plunger may be movable relative to the housing between a capture position and a release position. The plunger may be moved between the positions by the actuator. In operation, a technician may release the ball 74b by operating the launcher actuator. The launcher actuator may then move the plunger to the release position (not shown). The carrier and ball 74b may then move into a discharge flow line connecting the fracture pump 75 to the injector head 71. The pumped stream of fracturing fluid 77 (FIG. 5E) may then carry the ball 74b from the launcher 74h, into the wellhead 14 via the injector head 71 and tree 68, and to the frac plug 78.

The lubricator 66 may include a tool housing 66h (aka lubricator riser), a seal head 66s, one or more blowout preventers 66p, and a shutoff valve 66v. The seal head 66s may include a stuffing box and a grease injector. The BHA 70 may include a cablehead 79, a collar locator 80, a perforation gun 81, a setting tool 82, and the frac plug 78. The perforation gun 81 may include a firing head and a charge carrier. The charge carrier may include a housing, a plurality of shaped charges, and detonation cord connecting the charges to the firing head. In operation, the firing head may receive electricity from the wireline 69 to operate an electric match thereof. The electric match may ignite the detonation cord to fire the shape charges.

The setting tool 82 may include a mandrel and a piston longitudinally movable relative to the mandrel. The mandrel may be releasably connected to a mandrel of the frac plug 78, such as by one or more shearable fasteners (not shown). The setting tool 82 may include a firing head and a power charge. In operation, the firing head may receive electricity from the wireline 69 to operate an electric match thereof and fire the power charge. Combustion of the power charge may create high pressure gas which exerts a force on the setting piston.

Alternatively, a hydraulic pump may be used instead of the power charge to drive the setting piston. Alternatively, coiled tubing may be used instead of the wireline 69 and high pressure fluid may be injected through the coiled tubing to drive the setting piston.

The BHA 70 may be deployed into the production wellbore 10 using the wireline 69 with assistance from the fracture pump 75 or a tractor. Once the BHA 70 has been deployed to the setting depth listed by the fracturing plan, the frac plug 78 may be set by supplying electricity to the BHA at a first polarity via the wireline 69 to activate the setting tool 82. The setting piston may be driven toward a shoe of the frac plug 78 while the wireline 69 restrains the setting mandrel and plug mandrel, thereby compressing a packing element and driving slips along respective slip cones of the frac plug 78. The packing element may be radially expanded into engagement with the liner string 55 and the slips may be radially extended into engagement therewith.

A tensile force may then be exerted on the BHA 70 by operating a winch, thereby pulling the wireline 69 to fracture the shearable fasteners and releasing the frac plug 78 from the rest of the BHA 79-82. The remaining BHA 79-82 may then be raised using the wireline 69 until the perforation guns 81 are aligned with a lower production zone 83b of the reservoir 6, as listed in the fracturing plan. Electricity may then be resupplied to the remaining BHA 79-82 via the wireline 69 at a second polarity to fire the perforation guns 81 into the liner string 55, thereby forming perforations 84. Once the perforations 84 have been formed, the remaining BHA 79-82 may be retrieved to the lubricator 66 and into the tool housing 66h using the wireline 69. The lubricator shutoff valve 66v may then be closed.

The ball 74b may then be released from the launcher 74h and the fracturing fluid 77 may be pumped from the mixer 76 into the injector head 71 via the valve 72 by the fracture pump 75. The fracturing fluid 77 may be a slurry including: proppant, such as sand, water, and chemical additives. Continued pumping of the fracturing fluid 77 may drive the ball 74b toward the frac plug 78 until the ball lands onto a seat of the plug mandrel, thereby closing the plug mandrel bore.

Continued pumping of the fracturing fluid 77 may exert pressure on the seated ball 74b until pressure in the liner string 55 increases to force the fracturing fluid (above the seated ball) through the perforations 84, cement 57 (now cured) and into the lower production zone 83b by creating a fracture 85. The proppant may be deposited into the fracture 85 by the fracturing fluid 77. Pumping of the fracturing fluid 77 may continue until a desired quantity (listed in the fracturing plan) has been pumped into the production zone 83b. Middle 83m and upper 83u additional production zones (not shown) may be fractured using one or more additional respective BHAs (not shown) in a similar fashion.

Once the fracturing operation of all the production zones 83u,m,b has been completed, the lubricator 66 and injector head 71 may be removed from the tree 68. The CTU may be reconnected to the tree and the coiled tubing workstring deployed to mill the fracture plugs 78. The flow cross 68c may be connected to a disposal pit or tank (not shown) and spent fracturing fluid (minus proppant) allowed to flow from the production wellbore 10 to the pit. A production choke (not shown) may be connected to the flow cross 68c and to a separation, treatment, and storage facility (not shown). Production of the fractured zones 83u,m,b may then commence.

Alternatively, fracture valves may be assembled as part of the liner string 55 instead of having to perforate the liner string. A location of each fracture valve may be listed in the fracturing plan. A fracture valve may be included for each zone and the fracture valves opened using respective pump down plugs or deploying a shifting tool using wireline or coiled tubing. Alternatively, fracture valves may be assembled as part of the liner string 55 instead of having to perforate the liner string and each fracture valve may have a packer for isolating the respective zone instead of having to cement the liner string.

Alternatively, the production wellbore 10 may be extended from the exploratory wellbore 2.

While the foregoing is directed to embodiments of the present disclosure, other and further embodiments of the disclosure may be devised without departing from the basic scope thereof, and the scope of the invention is determined by the claims that follow.

The invention claimed is:
1. A synthetic logging method for stimulating a reservoir, comprising:
training a machine learning algorithm (MLA) using:
training inputs comprising historical or exploratory data measured by one or more logging tools selected from a group consisting of: passive nuclear logging tools and nonnuclear logging tools; and
training outputs comprising one or more property logs selected from a group consisting of: density logs; and porosity logs, wherein the one or more property logs are derived from the historical or exploratory data and additional historical or exploratory data measured by one or more tools containing radioactive sources;
generating a synthetic property log comprising one or more synthesized properties of the reservoir by supplying the trained MLA with inputs comprising data acquired from a production wellbore by one or more logging tools selected from a group consisting of: passive nuclear logging tools and nonnuclear logging tools, wherein the data is acquired without using an induced nuclear logging tool, wherein the data comprises measurements of one or more properties different than the one or more synthesized properties, wherein the synthetic property log is generated by the trained

MLA as an output based on the inputs, and wherein the synthetic property log comprises either a density log or a porosity log; and generating a stimulation plan by supplying the synthetic property log to a reservoir model, wherein the stimulation plan is used to stimulate the reservoir.

2. The method of claim 1, wherein:

the data is acquired from the production wellbore during drilling thereof, and the passive/nonnuclear logging tools are assembled as part of a bottomhole assembly of a drill string.

3. The method of claim 2, wherein the production wellbore has a deviated lower portion traversing the reservoir.

4. The method of claim 1, wherein the passive/nonnuclear logging tools comprise one or more of: a passive gamma sonde, a resistivity sonde, a caliper sonde, or an annulus temperature sonde.

5. The method of claim 1, wherein the data is acquired from the production wellbore during drilling thereof by:

mud logging drilling returns; and measuring drilling parameters.

6. The method of claim 1, wherein the historical or exploratory data is measured by logging a vertical exploratory wellbore traversing the reservoir using the one or more tools containing radioactive sources.

7. The method of claim 1, wherein the one or more tools containing radioactive sources include a pulsed neutron capture sonde.

8. The method of claim 1, wherein the data is acquired from the production wellbore during drilling thereof by measuring drilling parameters.

9. The method of claim 1, wherein the stimulation is hydraulic fracturing.

10. The method of claim 1, wherein the stimulation plan comprises a number of zones and a depth of each zone.

11. The method of claim 10, wherein the stimulation plan further comprises a fracture pressure of each zone.

12. The method of claim 1, wherein the MLA is a neural network.

13. A synthetic logging method for analyzing a reservoir, comprising:

supplying a trained machine learning algorithm (MLA) with inputs comprising data acquired from a production wellbore by one or more logging tools selected from a group consisting of: passive nuclear logging tools and nonnuclear logging tools, wherein the data is acquired without using an induced nuclear logging tool, and wherein the trained MLA was trained using:

training inputs comprising historical or exploratory data measured by one or more logging tools selected from a group consisting of: passive nuclear logging tools and nonnuclear logging tools; and training outputs comprising one or more property logs selected from a group consisting of: density logs; and porosity logs, wherein the one or more property logs are derived from the historical or exploratory data and additional historical or exploratory data measured by one or more tools containing radioactive sources;

generating a synthetic log comprising one or more synthesized properties of the reservoir using the trained MLA and the supplied data, wherein the supplied data comprises measurements of one or more properties different than the one or more synthesized properties, wherein the synthetic log is selected from a group consisting of: a density log and a porosity log, and wherein the synthetic log is generated by the trained MLA as an output based on the inputs; and generating a stimulation plan by supplying the synthetic log to a reservoir model, wherein the stimulation plan is used to stimulate the reservoir.

14. The method of claim 13, further comprising training the MLA using data measured by a pulsed neutron capture sonde.

15. A synthetic logging method for determining properties of a formation, comprising:

training a machine learning algorithm (MLA) using:

training inputs comprising historical or exploratory data including data measured by one or more logging tools selected from a group consisting of:

passive nuclear logging tools and nonnuclear logging tools; and training outputs comprising one or more property logs selected from a group consisting of: density logs; and porosity logs, wherein the one or more property logs are derived from the historical or exploratory data and additional historical or exploratory data measured by one or more tools containing radioactive sources;

generating a synthetic property log comprising one or more synthesized properties of the reservoir by supplying the trained MLA with inputs comprising data acquired from a production wellbore by one or more logging tools selected from a group consisting of: passive nuclear logging tools and nonnuclear logging tools, wherein the data is acquired without using an induced nuclear logging tool, wherein the data comprises measurements of one or more properties different than the one or more synthesized properties, wherein the synthetic property log is generated by the trained MLA as an output based on the inputs, and wherein the synthetic property log comprises either a density log or a porosity log; and generating a stimulation plan by supplying the synthetic property log to a reservoir model, wherein the stimulation plan is used to stimulate the reservoir.

* * * * *